US008069467B1

(12) United States Patent
Ogilvie (10) Patent No.: US 8,069,467 B1
(45) Date of Patent: Nov. 29, 2011

(54) PRIVACY PROTECTION THROUGH RESTRICTIONS ON USERNAMES AND OTHER ONLINE IDENTIFIERS

(76) Inventor: John W. Ogilvie, Salt Lake City, UT (US)

( * ) Notice: Subject to any disclaimer, the term of this patent is extended or adjusted under 35 U.S.C. 154(b) by 851 days.

(21) Appl. No.: 11/924,845

(22) Filed: Oct. 26, 2007

Related U.S. Application Data (60) Provisional application No. 60/865,757, filed on Nov. 14, 2006, provisional application No. 60/866,418, filed on Nov. 18, 2006, provisional application No. 60/868,619, filed on Dec. 5, 2006.

(51) Int. Cl.
*H04L 9/00* (2006.01)
*H04L 9/32* (2006.01)
*G06F 11/00* (2006.01)

(52) U.S. Cl. .............. 726/1; 726/2; 726/3; 726/4; 726/5; 726/6; 713/182; 713/183; 713/184; 713/185

(58) Field of Classification Search ........................ 726/1
See application file for complete search history.

(56) References Cited

U.S. PATENT DOCUMENTS

| | | | |
|---|---|---|---|
| 6,681,108 B1 | 1/2004 | Terry et al. | |
| 7,069,308 B2 | 6/2006 | Abrams | |
| 7,080,139 B1 | 7/2006 | Briggs et al. | |
| 2002/0023230 A1 | 2/2002 | Bolnick et al. | |
| 2003/0158888 A1* | 8/2003 | Bjorklund et al. | ............ 709/201 |
| 2004/0215793 A1 | 10/2004 | Ryan et al. | |
| 2005/0038876 A1 | 2/2005 | Chaudhuri | |
| 2005/0192999 A1 | 9/2005 | Cook et al. | |
| 2005/0256866 A1 | 11/2005 | Lu et al. | |
| 2006/0004590 A1 | 1/2006 | Khoo | |
| 2006/0041543 A1 | 2/2006 | Achlioptas | |
| 2006/0042483 A1 | 3/2006 | Work et al. | |
| 2006/0048059 A1 | 3/2006 | Etkin | |
| 2006/0074863 A1 | 4/2006 | Kishore et al. | |
| 2006/0121987 A1 | 6/2006 | Bortnik et al. | |
| 2006/0143067 A1 | 6/2006 | Calabria | |
| 2006/0190281 A1 | 8/2006 | Kott et al. | |
| 2006/0238380 A1 | 10/2006 | Kimchi et al. | |
| 2006/0259957 A1 | 11/2006 | Tam et al. | |
| 2007/0006301 A1* | 1/2007 | Nickell et al. | .................. 726/22 |

OTHER PUBLICATIONS

Joon Koh et al., "Encouraging Participation in Virtual Communities", Communications of the ACM, Feb. 2007, vol. 50 No. 2, pp. 69-73.
Steven Cherry, "Virtually Private: A new Swedish network helps you hide online", IEEE Spectrum, Dec. 2006, pp. 52 ff.
K.Y. Chan and S.W. Kwok, "Information Seeking Behavior in Peer-to-Peer Networks: An Exploratory Study", www.kc.tsukuba.ac.jp/dlkc/e-proceedings/papers/dlkc04pp40.pdf.
Norman Makoto Su et al., "A Bosom Buddy Afar Brings a Distant Land Near: Are Bloggers a Global Community?", www.ics.uci.edu/~normsu/papers/Su-Bosom-CT0S.pdf.

(Continued)

*Primary Examiner* — Longbit Chai
(74) *Attorney, Agent, or Firm* — Ogilvie Law Firm (57) ABSTRACT

Restrictions are placed on the content of usernames and other online identifiers to help maintain the privacy of offline identities of online users. A proposed username is tested by comparing at least a portion of its content to a set of personal identification information tokens that reflect aspects of an offline identity. The username is accepted if it satisfies a predetermined privacy criterion, which is defined in terms of matches to the personal identification information tokens. The user may receive questions regarding a proposed username and its relation, if any, to the online user's offline identity. Answers to the questions can be used to create personal identification information tokens which are compared to the proposed username.

22 Claims, 3 Drawing Sheets

OTHER PUBLICATIONS

"TAS Administration Manual" excerpts, from www.engenio.com on Nov. 20, 2006.
"Share a Beer with a Complete Stranger", from www.liquorsnob.com, Feb. 10, 2006.
"Staying online and staying healthy", from www.mysocialnetwork.net, Sep. 29, 2006.
"Re: [GNU-net developers] question on how to enforce anonymity", from copilotconsulting.com, Apr. 13, 2004.
Pages from www.soulcast.com, Nov. 13, 2006.
"Amidst Growing Internet Privacy Concerns, Online Blog Comunity SoulCast.com One-Ups MySpace and LiveJournal on Privacy", PRWeb, May 24, 2006.
"EFF Fighting To Protect AnonymityOf Video Publishers", from www.podcastingnews.com, Oct. 31, 2006.
"Anonymity Preserved for Online Embroidery Fans", from www.eff.org, Sep. 14, 2006.
"Hot-P2P '06 Program", web-minds.consorzio-cini.it, Apr. 29, 2006.
"Have you ever met anyone from here?", postings from community.channel4.com, Apr. 9, 2006.
"Have you ever met anyone from here?", postings from community.channel4.com, Oct. 13, 2006.
"How to . . . Go Meet someone that you Met online?", postings from forum.literotica.com:81, Aug. 10, 2003.
"Anonymous Communication", exitthematrix.dod.net, no later than Nov. 13, 2006.
"Social Networking using Google Maps mashups", googlemapsmania.blogspot.com, Sep. 1, 2006.
"Category:Social networking", en.wikipedia.org, Nov. 14, 2006.
"Social network", en.wikipedia.org, Nov. 14, 2006.
"Virtual community", en.wikipedia.org, Nov. 14, 2006.
"Meetup.com", en.wikipedia.org, Nov. 11, 2006.
Pages from www.diggwire.com, Nov. 14, 2006.
"The Experience Project", postings from www.asexuality.org, Sep. 14, 2006.
"Tell the World Something about Yourself", pages from www.experienceproject.com, Nov. 14, 2006.
"Welcome to the Experience Project", pages from www.experienceproject.com/learnmore.php, Nov. 14, 2006.
"Experience project is social networking by what you do, not who you know", blog.wired.com, Oct. 6, 2006.

* cited by examiner

PRIVACY PROTECTION THROUGH RESTRICTIONS ON USERNAMES AND OTHER ONLINE IDENTIFIERS

RELATED APPLICATIONS

The present application incorporates and claims priority to each of the following: U.S. provisional patent application Ser. No. 60/865,757 filed Nov. 14, 2006; U.S. provisional patent application Ser. No. 60/866,418 filed Nov. 18, 2006; and U.S. provisional patent application Ser. No. 60/868,619 filed Dec. 5, 2006.

BACKGROUND

Social network services are provided online for communities of people who share interests. Social network services provide ways for members of an online community to learn about each other, such as directories, profiles, personal pages, and search facilities. Social networks also build on or provide ways for members of an online community to communicate electronically with each other, such as chat, email, instant messaging, blogs, forums, video transmissions, and discussion groups.

Contacts made online through a social network using online identities may be pursued offline. People who first met online may decide to meet in person offline for dating, friendship, business, or philanthropic activities, for example. Even if a member of an online community chooses not to meet other members in person offline, the member's offline identity may become known to others, through a communication from the member or otherwise.

SUMMARY

In connection with some embodiments, restrictions are placed on the content of usernames and other online identifiers to help maintain the privacy of offline identities of online users. A proposed username is tested by comparing at least a portion of its content to a set of personal identification information tokens that reflect aspects of an offline identity. The username is accepted if it satisfies a predetermined privacy criterion, which is defined in terms of matches to the personal identification information tokens. The user may receive questions regarding a proposed username and its relation, if any, to the online user's offline identity. Answers to the questions can be used to create personal identification information tokens which are compared to the proposed username.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Reference will now be made to exemplary embodiments such as those illustrated in the drawings, and specific language will be used herein to describe the same. But alterations and further modifications of the features illustrated herein, and additional applications of the principles illustrated herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage, in the usage of a particular industry, or in a particular dictionary or set of dictionaries. Reference numerals may be used with various phrasings, to help show the breadth of a term. Omission of a reference numeral from a given piece of text does not necessarily mean the content of a Figure is not being discussed by the text. The inventor asserts and exercises his right to his own lexicography. Terms may be defined, either explicitly or implicitly, here in the Detailed Description and/or elsewhere in the application file.

As used herein, a "computer system" may include, for example, one or more personal computers (portable or not), servers, personal digital assistants, cell or mobile phones, and/or device(s) having a processor controlled at least in part by instructions. The instructions may be in the form of software in memory and/or specialized circuitry. In particular, although it may occur that many embodiments run on personal computers and/or on servers, other embodiments may run on other computing devices, and any one or more such devices may be part of a given embodiment. Terms such as "computerized" refer to devices having a microprocessor and memory, not merely to personal computers or servers.

"Electronic" refers to digital and/or analog electronic circuitry.

Some examples of "electronic communications" include an email, an instant message, a blog entry, a blog comment, a forum posting, a video file or stream, a voip communication, a web page access, a voicemail, a text message.

"Automatic" means without requiring ongoing real-time human input or guidance to perform the immediately contemplated operation.

Operating Environment

Figure 1:
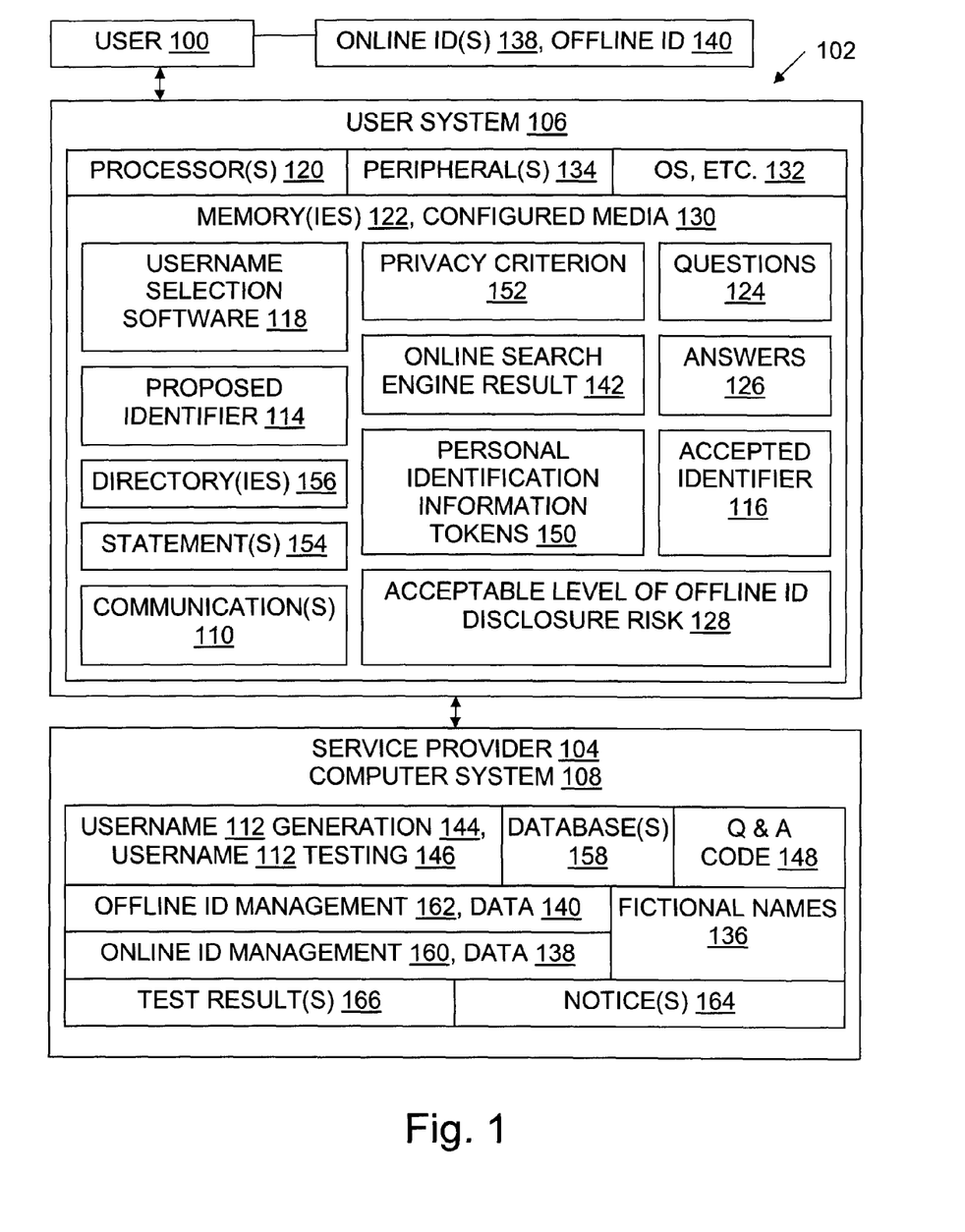
FIG. 1 is a block diagram illustrating an operating environment, some roles, some data structures, and some system and configured storage medium embodiments.

With reference to FIG. 1, roles within an operating environment for an embodiment may include one or more users 100 and a service provider 104. A user 100 may be a member 100 of an online community 102 or otherwise participate by sending and/or receiving electronic communications 110 in a networked environment 102 that involves displaying a username 112 or other online identifier 138 of the user 100 to other people. In a given configuration, the service provider 104 may also be a member of the online community. A networked environment 102 may have more than one service provider, e.g., it may have both an internet service provider (ISP) and an online community services provider (OCSP), with service provider 104 services being provided by either of these or by both the ISP and the OCSP, depending on the configuration. Commercial embodiments may operate on an ad-revenues business model, on a user-fee model (e.g., with anonymous payments), and/or on other business models.

In some configurations, the service provider 104 provides general-purpose services such as email, web page hosting and message forum hosting, which have been adapted by or on behalf of members 100 for uses specific to the online community. In some configurations, the service provider 104 provides services that are specific to the online community, such as online profile editing software. In some configurations, the service provider 104 provides both general-purpose services and specific services to support the online community.

Because of space limitations, FIG. 1 shows only one user 100 and only one service provider 104. However, a given configuration may include one or more service providers with zero or more users, or one or more users with zero or more service providers, depending on the requirements of the embodiment being discussed. Each of these entities may also belong to or facilitate one or more online communities 102 in a given configuration.

An operating environment for an embodiment may include, for instance, a user computer system 106 and a service provider computer system 108. Each computer system 106, 108 has a processor 120 and a memory 122 which operate together to provide functionality discussed herein. Different user computer systems 106 need not be identical with each other.

Some of the functionality discussed herein is provided, at least in part, by software. Software includes instructions that are executable by a processor 120 and also includes data which is created, modified, referenced, structured, and/or otherwise used by the instructions. The software's instructions and data configure the memory(ies) 122 in which they reside. For example, the software may configure a removable memory device 130 such as a DVD or a flash memory even when that memory device is not plugged into a computer system. The software may also configure a memory 122 that is a functional part of a given computer system, such as RAM or a plugged-in removable memory 130, in which case the software instructions and data also configure the given computer system.

Networking interface equipment 134 such as a packet-switched network interface card, a wireless transceiver, or a telephone network interface, for example, will generally be present in a computer system 106. Peripheral equipment 134 such as human user I/O devices (screen, keyboard, mouse, microphone, speaker, motion sensor, etc.) will also generally be present in operable communication with the processor 120 and the memory 122. However, a software embodiment for generating and/or testing usernames as discussed herein may also be so deeply embedded, such as on a service provider server 108, that the software in the embodiment has no human user interaction through human user I/O devices during normal operation.

An operating environment for an embodiment may include a single user computer system 106 and/or a single service provider computer system 108. A given embodiment may also include two or more computer systems 106, 108, linked to one another for networked communication. The networked environment 102 may be a social network or any other environment 102 that supports displaying or otherwise disclosing a username 112 or other online identifier 138, in a profile, a buddy list, a directory, or any other format.

Each computer system 106, 108 may run any network and operating system software 132, and may use any network interface equipment and other peripheral equipment 134, now known or hereafter formed. The operating environment may include user computer systems 106 that are client-server networked and/or peer-to-peer networked.

User Systems

In some embodiments, a computer system 106 configured for use by a user 100 includes a memory 122 configured with computer-executable instructions, and a processor 120, coupled with the memory, that executes instructions. The instructions are part of username selection software 118 with which the member 100 electronically proposes and/or helps test usernames 112 and/or other online identifiers 138. The user 100 may participate in, or merely receive the benefit of, username testing as part of username selection, in order to reduce the risk that a username 112 or other online identifier 138 will disclose information about a member's offline identity 140.

Note that in connection with FIG. 1, proposed usernames and other proposed identifiers are denoted by reference numeral 114 to distinguish them from accepted identifiers, which are denoted by reference numeral 116. Each of these types of username 114, 116 is also an instance of usernames generally, which are denoted by reference numeral 112. A username 112 is an example of an online identity 138, also referred to as an online identifier 138. Some other examples of online identifiers 138 are email addresses, web page addresses, pseudonyms, handles, and avatars. Unless a discussion is expressly limited to usernames and rules out other online identifiers, a discussion regarding usernames also pertains to other online identifiers.

In short, reference numeral 112 refers to usernames generally, whether proposed for use or accepted for use consistent with privacy protection as discussed herein; reference numeral 114 refers to proposed usernames and other proposed online identifiers; reference numeral 116 refers to accepted usernames and other accepted online identifiers; and reference numeral 138 refers to online identifiers generally, including but not limited to usernames, whether proposed for use or accepted for use.

In some embodiments a user operates username selection software 118 on a user system 106, thereby electronically receiving a question 124 regarding a proposed username or other online identifier 114 and its relation, if any, to the user's offline identity 140, and then electronically providing an answer 126 to the question, for use in testing a username or other online identifier 138 to assess the risk that it will disclose or currently discloses some aspect of the user's offline identity 140. In particular, an interactive question-and-answer sequence may prompt the user to answer questions about how the proposed username relates to the user's family, work, personal beliefs, offline contact information, and/or physical characteristics. In some cases, a user may be asked whether part of a search engine search result 142 pertains to the user.

In some embodiments, a user proposes a username 114 for testing by entering (typing, speaking, etc.) the username into the username selection software 118. In some embodiments a user of the software 118 electronically specifies an acceptable level of risk 128 that a proposed username 114 will disclose information about the online user's offline identity 140. An acceptable level of risk 128 is an example of a privacy criterion 152; another example would be a privacy criterion 152 which disallows matches between particular aspects of personal offline identity 140 (represented by tokens 150) and a proposed online identifier 114. In some embodiments a user of the software 118 electronically makes a statement 154 about a proposed username 114, such as a statement that the proposed username is a fictional name 136.

Some user systems 106 have installed include general protection software such as encryption software, anti-phishing software, firewall software, anti-virus software, anti-adware software, anonymizing software, and the like. General protection software may be used to further raise awareness of identity crimes and reduce unwanted impositions on privacy. However, general protection software is not specifically designed to help protect privacy as described herein by reducing the risk that a username or other instance of online identity will disclose a private aspect of a user's offline identity.

Some user systems 106 are configured with application software such as word processors, email and instant messaging programs, and/or other applications that can be used to create, modify, transmit, store, retrieve, and/or otherwise manage electronic communications 110. However application software is not specifically designed to help protect privacy as described herein by reducing the risk that a username or other instance of online identity will disclose a private aspect of a user's offline identity.

Figure 2:
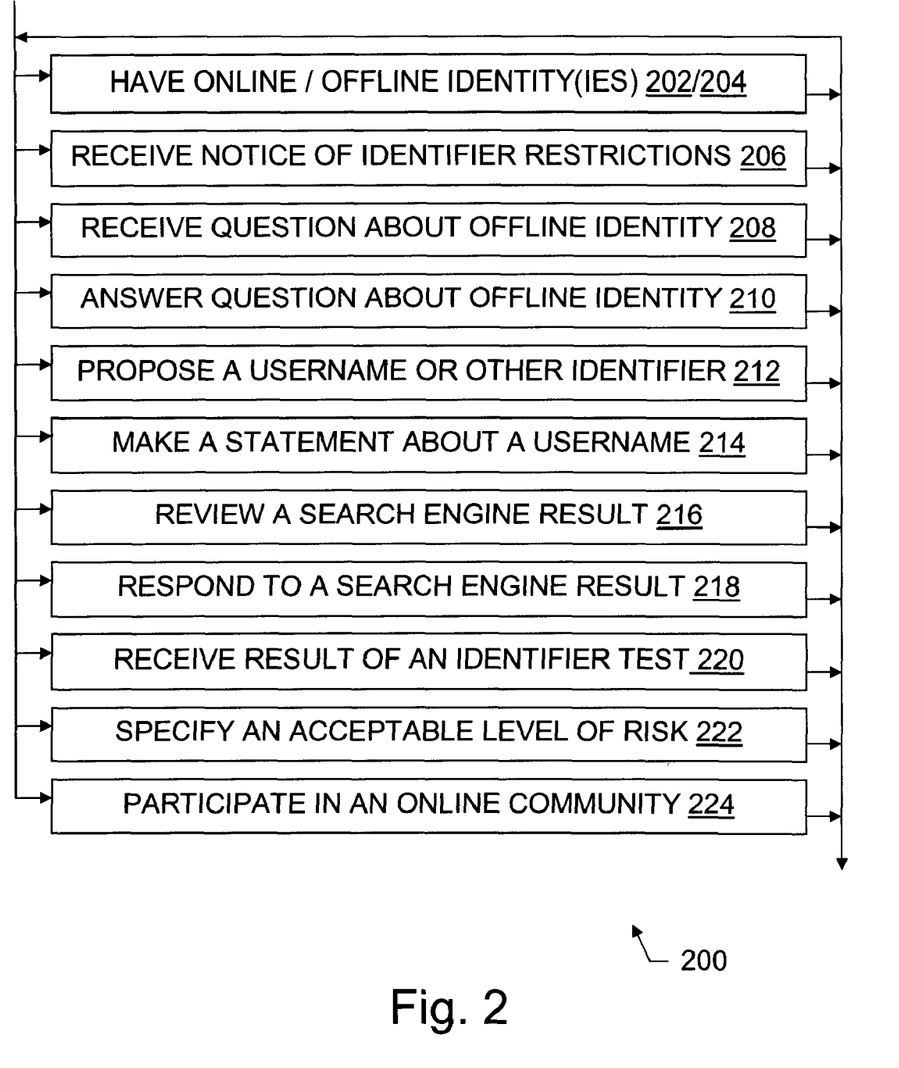
FIG. 2 is a flow chart illustrating steps of some method and configured storage medium embodiments from a point of view of a member of an online community or other environment in which usernames are displayed.

In some embodiments of user systems 106, the processor coupled with the memory executes instructions for performing other steps, including one or more of the steps illustrated in FIG. 2.

Service Provider Systems

In some embodiments, a computer system 108 configured for use by a service provider 104 includes a memory 122 configured with computer-executable instructions, and a processor 120, coupled with the memory, that executes instructions, although these computer system components are not shown in system 108 in FIG. 1 due to space limitations. The instructions are part of username generation software 144 with which the service provider 104 electronically generates proposed usernames 114, username testing software 146 with which the service provider 104 electronically tests proposed usernames 114, and/or question and answer software with which the service provider 104 electronically questions a user and receives answers from the user about proposed usernames 114, for example.

In some embodiments, a service provider system 108 is configured with software to help maintain the privacy of offline identities 140 of online users 100. The system 108 may test a proposed username 114 by automatically comparing at least a portion of the content of the proposed username to a set of personal identification information tokens 150. Personal identification information tokens 150 may be derived from parsing or searching personal information 140 supplied by a user, one or more directories 156, one or more databases 158, and/or a collection of fictional names 136, for example. A proposed username 114 may become an accepted username 116 if the username satisfies a predetermined privacy criterion 152 which is defined in terms of matches to personal identification information tokens 150.

Some service provider systems 108 are configured with online identity management software 160, which manages online community member online identity data 138 such as member profiles and usernames. For example, online identity management software 160 may require a password from a member 100 before allowing the member to read members-only postings or allowing the member to make a change in a profile of the member that is published in the online community 102.

Some service provider systems 108 are configured with offline identity management software 162, which manages offline community member online identity data 140 such as member mailing addresses and legal names. For example, offline identity management software 162 may require a password from a member 100 before allowing the member to enter a change of address.

Figure 3:
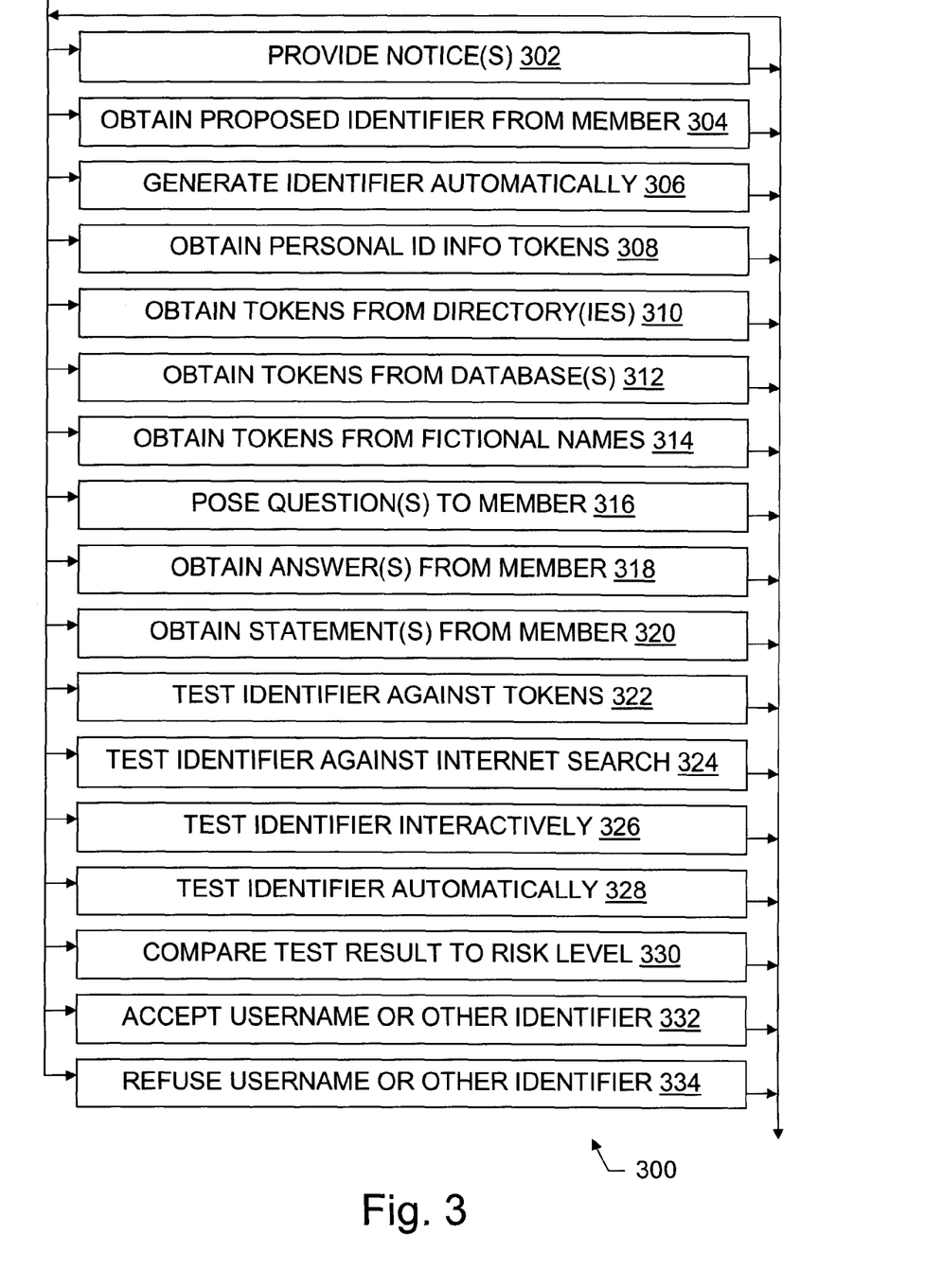
FIG. 3 is a flow chart illustrating steps of some method and configured storage medium embodiments from a point of view of a service provider.

In some embodiments of service provider systems 108, the processor coupled with the memory executes instructions for performing other steps, including one or more of the steps illustrated in FIG. 3.

Space limitations and deference prevent showing every item in FIG. 1 at every possible location of the item. For example, in some embodiments a question 124 exploring the relation, if any, between a username 112 or other online identifier 138 and a user's offline identity 140 is generated on a service provider computer system 108 and then transmitted over a network to a user computer system 106, despite the fact that FIG. 1 does not expressly illustrate a question 124 on the service provider computer system 108 shown. As another example of how FIG. 1 merely helps illustrate possible configurations, each of the computer systems 106, 108 has one or more processors 120 and at least one memory 122, even though these two items are shown expressly only for user computer system 106.

Not every item shown in FIG. 1 need be present in every system embodiment or in every configured medium embodiment. Although implementation possibilities are illustrated here in text and drawings by specific examples, other embodiments may depart from these examples. For instance, specific features of an example may be omitted, renamed, grouped differently, repeated, instantiated in hardware and/or software differently, or be a mix of features appearing in two or more of the examples.

Configured Media

Some embodiments include a configured computer-readable storage medium 130. In a computer system 106, 108, disks (magnetic, optical, or otherwise), RAM, EEPROMS or other ROMs, and/or other configured storage medium can be provided as part of working memory 122, and/or in addition to working memory 122. A general-purpose storage medium, which may be removable or not, and may be volatile or not, is configured with data structures and instructions to thereby form a configured medium which is capable of causing a system with a processor to perform steps and provide functionality disclosed herein.

Configuring a system with such data and/or such instructions creates a special-purpose system which accepts input representing aspects of a user's offline identity 140 and transforms that input to provide useful and concrete results that help reduce the risk that a username, email address, or other instance of online identity will reveal private offline identity information. FIG. 1 helps illustrate configured storage media embodiments, as well as system embodiments, process product embodiments, and method embodiments. A configured medium may also be considered an article of manufacture and/or a process product, produced using for example steps shown in FIG. 2 or FIG. 3.

For example, a system may be configured with data such as personal identification information tokens 150, data such as an acceptable level of offline identity disclosure risk 128, and/or data such as questions 124 and answers 126 which explore possible relationships between offline and online identities, privacy criteria 152, and usernames 112, 114, 116.

Also, a system may be configured with instructions capable of performing functions such as generating usernames 114 (e.g., with software 144 by combining words not commonly used in legal names), testing usernames 114 for disclosure of offline identity information (e.g., with software 146), and obtaining feedback from a user about possible relationships between offline and online identities (e.g., with software 148).

In some embodiments, a storage medium 130 is configured to cause electronic performance of a method for use by an online service provider to help maintain the privacy of offline identities of online users. The method includes testing a proposed username 114 by comparing at least a portion of its content to a set of personal identification information tokens 150; and accepting the proposed username if it satisfies a predetermined privacy criterion 152, the privacy criterion being defined in terms of matches to personal identification information tokens. In some embodiments, the testing compares proposed username content to tokens using an interactive question-and-answer session with a user, in some testing includes an automatic string operation, and in some embodiments both occur.

In some embodiments, the tokens 150 are obtained from personal information 140 supplied by an online user 100. In some, tokens 150 are obtained from one or more directories 156, such as a directory containing offline addresses, online addresses, family names, personal names, and/or phone numbers. In some embodiments, the tokens 150 are obtained from one or more databases 158, such as a database containing registrations, licenses, grants, and/or government records. In some, tokens 150 are obtained from a collection 136 of fictional names. In some embodiments, the tokens 150 are obtained from an online search engine search result 142.

In some embodiments, the instructions and data cause a system to accept from an online user 100 a proposed username 114 or other online identifier 138 to be tested. This may be done, using one or more of the following modules: username selection software 118, question and answer management software 148, online identity management software 160, and the corresponding hardware. In other embodiments, the instructions and data, e.g., in software 144, cause a system to automatically generate a proposed username before testing the proposed username.

In some embodiments, the instructions and data cause a system to electronically perform a method for username selection which reduces the risk that a username or other online identifier 138 will disclose information about an online user's offline identity. The method includes a user 100 receiving a question 124 regarding a proposed online identifier 114 and its relation, if any, to the online user 100's offline identity 140; and answering the question 124. The user 100 may receive and answer additional questions regarding the proposed username and its relation, if any, to the user's offline identity. In some embodiments, the system operates to let the user propose a username 114, e.g., by typing one in. In some embodiments, the system operates to let the user specify an acceptable level of risk 128 that the proposed username will disclose information about the online user's offline identity 140. In some, the system accepts a statement 154 from a user 100 that a proposed username 114 is a fictional name 136, and hence is unlikely to disclose offline identity 140.

Methods

FIGS. 2 and 3 illustrate some method embodiments. In a given embodiment zero or more illustrated steps of a method may be repeated, perhaps with different parameters or data to operate on. Steps in an embodiment may also be done in a different order than the top-to-bottom order that is laid out in the Figures. Steps may also be omitted, combined, or otherwise depart from the illustrated flow, provided that the method performed is operable and conforms with at least one claim.

FIG. 2 shows a flow chart 200 illustrating steps of some method and configured storage medium embodiments from a point of view of a user 100, such as a member 100 of an online community 102 or another networked environment 102 within which an aspect of the user's online identity 138 such as a username 112 is published.

Actions by a user discussed herein may equivalently be considered actions by software and hardware for which the user is responsible, e.g., by a system over which the user has control, and vice versa. The same holds true of actions by a service provider. That is, a system of hardware and software, a system of hardware, and a system of software, may each be deemed an agent or alter ego of a human who controls that system.

As indicated by steps 202 and 204, a user has one or more online identities 138 and one offline identity 140, respectively. In particular, a user may have 202 an online identity which is published within an online community 102, and may also own 204 an offline identity which is not published within the online community. The user 100 may have online identities 138 in the form of usernames, avatars, personal web pages, and other online data which reflects aspects of the user's activities and preferences.

Online identity is generally under at least partial control of the user, and in many cases is under complete, or nearly complete, control of the user, e.g., by setting profile information and choosing email addresses. Indeed, a user may choose to have more than one online identity within a given online community.

By contrast, the offline identity of a given user can be considered unique. However, this is a definitional preference, not a requirement in every embodiment. One could also define offline identities 140 according to time periods in the user's life, for example, or roles played by the user in the offline worlds, e.g., at home versus at work. Online identities can, however, provide some anonymity which is rarely if ever provided by offline identities.

During a notice receiving step 206, a user receives electronically a notice 164 that usernames 112 and/or other aspects of online identity 138 are subject to restrictions to reduce the risk that they disclose personal offline information. A notice 164 may be delivered by email, instant message, voicemail, text message, or be in the form of some other electronic communication. A notice 164 may be received 206 in connection with admission to membership in an online community, creation of an electronic communication 110 by a user, updates sent to online community membership generally, or submission of a proposed username, email address, etc. 114 by a particular user.

During a question receiving step 208, a user receives electronically a question 124 pertaining to possible disclosure of offline identity 140 by an online identity item 138 such as a username 112. Questions 124 may be received 208 on a screen 134, or received through a speaker 134, for example.

During a question answering step 210, a user sends electronically an answer 126 to a question 124. Answers 126 may take a form such as "yes"/"agree"/"correct"/"true", "no"/"disagree"/"incorrect"/"false", "pass"/"choose not to answer"/"move to next question", "don't know"/"perhaps". Answers 126 may be sent 210 through a mouse 134 click, key 134 press, or microphone 134, for example.

For example, in some embodiments software 118 and/or software 148 generates one or more questions 124 of the type shown below, and also captures a user's answers to those questions. In actual questions, <proposed identifier> is replaced by the proposed username 114, proposed email address 114, or other proposed online identifier.

"Does <proposed identifier> contain any part of your name?"

"Does <proposed identifier> contain any part of the name of anyone in your family?"

"Does <proposed identifier> contain any part of the name of anyone you have met?"

"Does <proposed identifier> contain the name of your pet?"

"Does <proposed identifier> contain a nickname you use?"

"Does <proposed identifier> contain the name of your employer?"

"Does <proposed identifier> contain the name of a business you are connected with?"

"Does <proposed identifier> refer to your religious or spiritual beliefs?"

"Does <proposed identifier> refer to your political beliefs?"

"Does <proposed identifier> refer to any organization to which you belong or which you support?"

"Does <proposed identifier> refer to any of your physical characteristics (e.g., height, weight, gender, race, hair color, eye color, tattoos, disabilities)?"

"Does <proposed identifier> refer to your ethnicity?"

"Does <proposed identifier> refer to your gender?"

"Does <proposed identifier> contain any part of any of your offline addresses?"

"Does <proposed identifier> contain any part of any of your phone numbers?"

In the case of a username specifically, one or more of the following questions 124 may be posed to a user 100.

"Does <proposed username> contain any part of any of your email addresses?"

"Does <proposed username> contain any part of a website address?"

In some embodiments software 118 and/or software 148 displays part of a search engine search result 142 and asks the user whether the displayed result pertains to the user or anyone the user knows personally.

During a proposing step 212, a user 100 electronically submits a proposed username 114 or other proposed online identifier 114. This may be done through a keyboard 134, microphone 134, or other I/O device.

During a statement making step 214, a user 100 electronically submits a statement 154 about a username 112 (proposed or accepted) or another online identifier 138. This may be done through a keyboard 134, microphone 134, or other I/O device. For example, a user 100 may state 214 that a proposed username 114 is a fictional name 136, or that an accepted email address 138 includes a fictional name 136.

During a search result reviewing step 216, a user 100 reviews a search result 142 or an excerpt from a search result 142, to help determine whether the search reveals any aspect of the user's personal offline identity 140. The search result may be displayed on a screen 134 or recited through a speaker 134, for example.

During a search result responding step 218, a user 100 responds to a search result 142 or an excerpt from a search result 142. This may be done through a keyboard 134, microphone 134, or other I/O device. For example, a user 100 may respond by indicating that the search result has nothing to do with the user's offline identity 140; that the search result pertains to the user but does not reveal—in combination with a proposed identifier 114—more information than the user is comfortable having revealed; or that the search result in combination with the proposed identifier 114 is too revealing and the proposed identifier 114 should therefore be rejected.

During a test result receiving step 220, a user 100 receives electronically a result 166 of a test which checked for possible disclosure of offline identity 140 by a proposed online identifier 138 such as a username 114. Test results 166 may be received 220 on a screen 134, or received through a speaker 134, for example. Test results 166 may simply state "pass"/"OK"/"accepted", or "fail"/"not OK"/"rejected". Test results 166 may also give a reason for rejection when a proposed identifier fails, e.g., "Proposed username contains part of your phone number", or "This email address should not be used because it contains part of your birthday."

During an acceptable risk level specifying step 222, a user 100 electronically specifies a level of risk the user is comfortable with, so far as disclosure of the user's offline identity 140 in published online identity items 138 (such as username or email address) is concerned. This may be done through a user interface mechanism such as a mouse 134, keyboard 134, or microphone 134. In some embodiments, the user 100 slides a graphical slider bar, moves a virtual door or other image of a physical barrier to a position that appears more closed or more open, makes a selection from a list, speaks into a microphone 134, or otherwise uses an interface portion of software 118 to enter a value representing a level of disclosure risk 128 chosen by the user.

In some embodiments, an acceptable level of risk 128 is indicated by a numeric value. For instance, a member may be asked a question such as "On a scale of one to ten, with one being 'don't care if anyone knows it' and ten being 'must keep this completely private', how important is it that you not disclose online any part of your offline contact information?" In some embodiments, an acceptable level of risk 128 is indicated by an enumeration value, such as "Completely avoid disclosing offline contact info", "Try hard to avoid disclosing", "OK to disclose an obscure part", "OK to disclose birthday", "OK to disclose any or all of my contact info". In some embodiments, an acceptable level of risk 128 is associated with one or more particular offline identity 140 items, e.g., it may be more acceptable to disclose a first name than it is to disclose a phone number.

During a participating step 224, a user participates in an online community or other network environment 102 by submitting electronic posts, sending/receiving other electronic communications, and so on. For example, a social network 102 may be organized into groups based on shared interest in a given topic and/or based on questions of the form "Looking for advice on ______" or "Has anyone ever ______?". Participation 224 may be limited to members of an online community 102.

Some steps such as receiving 206 a notice may be performed during registration of new members, or even earlier during marketing of an online community 102. The term "member" as used herein should be understood to include not only current members 100 of an online community 102 but also prospective members 100 who express interest in joining the online community 102, and in-process-of-registration members 100 who are in the process of joining the online community 102.

FIG. 3 shows a flow chart 300 illustrating steps of some method and configured storage medium embodiments from a point of view of a service provider. Methods illustrated in FIG. 3 may help service providers 104 and others maintain a separation between online and offline information of members of an online community, for example.

During a notice providing step 302, a service provider 104 provides one or more notices 164 to one or more users 100 in a networked environment 102 that is being served by the service provider. For example, a service provider 104 may electronically provide 302 a notice that usernames 112 within an online community 102 will be regulated to limit disclosure of offline personal information in the online environment. Notice providing step 302 corresponds generally to notice receiving step 206, except that notice providing step 302 is performed by a service provider whereas notice receiving step 206 is performed by a user.

During username locating steps 304 and 306, a service provider 104 (or equivalently as noted, a system acting on behalf of a service provider) locates a proposed username 114 or other proposed online identifier to be tested for risk of disclosure of offline identity information 140.

During a step 304, a proposed username 114 is located by being obtained from a user, e.g., through username selection software 118. This corresponds generally to username proposing step 212, except that username obtaining step 304 is performed by a service provider whereas step 212 is performed by a user.

During a step 306, a proposed username 114 is located automatically, e.g., by an automatic generation 306 of a proposed username 114 by software 144. Other online identity items 138, such as email addresses, web page addresses, and the like, may also be obtained automatically 306.

During a personal identification information token obtaining step 308, one or more personal identification information tokens 150 are obtained, e.g., by software 118, software 146, software 148, and/or software 162. As with other software discussed herein, the functionality that software and attendant hardware provide is generally more important than the location of the software, at least with regard to the claims, although some locations may be more efficient or otherwise preferable to other locations.

Regardless, tokens 150 may be implemented using strings or hash values based on strings, for example. Each token represents an aspect of an offline identity 140, e.g., a family name, a first name, a birth date, and other information, including without limitation answers 126 elicited by questions 124. Tokens 150 may be obtained from freeform input and/or obtained 310 from directory 156 entries by string operations such as string matching, substring copying, string search, and string parsing. Tokens 150 may be obtained 312 from databases 158 by database record read and field read operations, for example. A collection 136 of fictional names may be in the form of delimited strings, or database entries, for instance, and may thus be obtained 314 by corresponding string operations or database operations.

During a question posing step 316, a system electronically poses one or more questions 124, automatically selected, to a user 100 to obtain information used in testing proposed usernames 114 and/or other proposed online identifiers 138. Question posing step 316 corresponds generally with question receiving step 208, except that step 316 is performed by a service provider 104 (or system acting under the control of a service provider), whereas step 208 is performed by a user 100 (or system acting under the control of a user).

During an answer receiving step 318, a system receives electronically one or more answers 126 from a user 100, including information to be used in testing proposed usernames 114 and/or other proposed online identifiers 138. Answers 126 may be implemented using bitflags to capture responses to yes/no questions 124, and using strings or other data structures to capture responses to questions 124 that ask for names, birth dates, and other offline identity items 140. Answer receiving step 318 corresponds generally with question answering step 210, except that step 318 is performed by a service provider 104 (or system acting under the control of a service provider), whereas step 210 is performed by a user 100 (or system acting under the control of a user).

During a statement receiving step 320, a system receives electronically one or more statements 154 from a user 100, such as a user statement that a proposed username 114 or portion thereof (or other proposed online identifier) is fictional, thus implying that it does not disclose the user's offline identity 140. Statements 154 may be implemented using bitflags, for example. Statement receiving step 320 corresponds generally with statement making step 214, except that step 320 is performed by a service provider 104 (or system acting under the control of a service provider), whereas step 214 is performed by a user 100 (or system acting under the control of a user).

During a testing step 322, a proposed username 114 or portion thereof (or other proposed online identifier 138) is tested, e.g., by software 146 and corresponding hardware, by comparing the proposed online identifier 138 to personal identification information tokens 150. To the extent that one or more tokens 150 match the proposed online identifier 138, the proposed online identifier 138 poses a risk of disclosing offline identity 140. Testing may be done with parsing and string comparison, for example. In some embodiments, a test result 166 is a simple match/no match value; in some, a test result 166 is a count or other indication of the exact or approximate number of tokens 150 found to match, e.g. "three matches to aspects of your offline identity" or "multiple matches to aspects of your offline identity"; in some, the test result 166 is a subjective term chosen based on the exact or approximate number of tokens 150 found to match, e.g. "extreme chance of disclosure detected"; in some, the test result 166 is a weighted sum, e.g., with a name token match counting more than a birthday token match.

During a testing step 324, a proposed username 114 or portion thereof (or other proposed online identifier 138) is tested, e.g., by software 146 and corresponding hardware, by comparing the proposed online identifier 138 to some or all of a result 142 obtained by searching the internet and/or another network using a search engine. Personal identification information tokens 150 (or corresponding strings if the tokens 150 are not implemented by strings) are used as keyword(s) to guide the search that produces the search result 142. A goal of the search may be determining whether search results combined with some aspect of a user's offline identity 140 could be tied to a proposed username 114 of the user 100 and/or whether search results combined with the proposed username 114 could be tied to some aspect of the user's offline identity 140. Service provider testing step 324 may be coordinated with user search engine result reviewing step 216 and with user search engine result responding step 218.

During an interactive username testing step 326, a proposed username 114 or portion thereof (or other proposed online identifier 138) is interactively tested using software 118 through an exchange 316, 318, 320 of one or more questions 124 and answers 126, statements 154, and/or search results 142 between a service provider 104 and a user 100. Testing 322, 324 may be done in coordination with steps 316-320 as part of testing step 326.

During an automatic username testing step 328, a proposed username 114 or portion thereof (or other proposed online identifier 138) is automatically tested 322 and/or 324 using software 146, and information obtained for example by automatically using steps 306, 308, 310, 312, 314.

During a test result risk level comparing step 330, a result of one or more testing steps such as steps 322, 324, 326, 328 is compared with a default acceptable risk level 128 or with an acceptable risk level 128 previously obtained using step 222.

If the comparison 330 shows that the risk of user 100 offline identity disclosure 140 associated with an intended use of a proposed username 114 or portion thereof (or other proposed online identifier 138) is not greater than the acceptable risk level 128, then the proposed online identifier 138 is flagged as OK and is accepted 332 for the intended use. An express acceptance may be displayed to the user 100 by software 118, or the acceptance may be implicit in that the user 100 is allowed to simply move on to the next phase of registration or to start using the online identifier 138. Regardless, the proposed online identifier 138 becomes an accepted online identifier 116.

On the other hand, if the comparison 330 shows that the risk of user 100 offline identity disclosure 140 associated with an intended use of a proposed online identifier 114 is greater than the acceptable risk level 128, then the proposed identifier 114 is flagged as too risky and rejected 334. A refusal message may be displayed to the user, e.g., through software 118, if the user proposed 212 the now-refused identifier for use. However, a refusal message would likely not be displayed if the now-refused identifier was generated 306 automatically, unless perhaps a display of successive candidate identifiers 114 is shown as a progress or activity indication while the software 118 runs tests.

Steps such as providing 302 notices 164, and automatically obtaining 308, 310, 312, 314 personal identification information tokens 150, may be performed before, during, or after registration in environments 102 that involve user 100 registration.

Some embodiments include a method for use by an online service provider 104 to help maintain the privacy of offline identities 140 of online users 100, the method including testing 322 a proposed username 114 by comparing at least a portion of its content to a set of personal identification information tokens 150; and accepting 332 the proposed username if it satisfies a predetermined privacy criterion 152, the privacy criterion being defined in terms of matches to personal identification information tokens. For example, the privacy criterion 152 might require automatic rejection of proposed usernames that contain a first and last name 140, contain a telephone number 140, or contain a business name that appears in the same paragraph of a search result 142 as a mailing address.

In some embodiments, the testing step 322 compares proposed username content 114 to tokens 150 using at least one of the following: an interactive question-and-answer session 316, 318; an automatic string operation 310, 312, 314. In some, the testing step 322 compares proposed username content to tokens obtained from personal information 140 supplied by an online user 100, and the privacy criterion is defined in terms of avoiding matches to those tokens, e.g., allowing some matches while disallowing others. In some, the testing step 322 compares proposed username content 114 to tokens 150 obtained 310 from at least one of: a directory of offline addresses, a directory of online addresses, a directory of names, a directory of phone numbers, and the privacy criterion is defined in terms of avoiding matches to those tokens. In some, the testing step 322 compares proposed username content to tokens 150 obtained 312 from at least one of: a database of registrations, a database of licenses, a database of grants, a database of government records, and the privacy criterion is defined in terms of avoiding matches to those tokens. In some, the testing step 322 compares proposed username content to tokens 150 obtained from a collection of fictional names 136, and the privacy criterion 152 is defined in terms of matching those tokens, e.g., accepting 332 a username if it matches a fictional name 136. In some, the testing step 322 compares proposed username content to a result 142 of an online search engine search.

Some embodiments include a method for username selection which reduces the risk that a username will disclose information about an online user's offline identity, the method including: receiving 208 a question 124 regarding a proposed username 114 and its relation, if any, to the online user's offline identity 140; and answering 210 the question. Some include receiving 208 additional questions 124 regarding the proposed username and its relation, if any, to the online user's offline identity, and answering 210 the additional questions. Some include proposing 212 a username. Some include specifying 222 as a privacy criterion 152 an acceptable level of risk 128 that the proposed username will disclose information about the online user's offline identity 140. Some include stating 214 that the proposed username is a fictional name 136 and thus discloses nothing substantial about the user's offline identity 140.

Additional Examples

Some possible embodiments provide new social networking tools and techniques, and in particular, new tools and techniques for facilitating social networks in which members meet online but face little or no risk of ever meeting offline. Some of these possible embodiments include features beyond the avoidance criteria and risk level features discussed above. Features are discussed below in connection with various "embodiments" but it will be understood that a claim defines what actually constitutes an embodiment of that claim, so features discussed in examples should not necessarily be read into a given claim.

Some embodiments may help encourage and support online communities which have an ethos of members providing other members with anonymous help based on candid disclosure of opinions and social facts online, with little risk that the disclosures will lead to unwanted or complicated offline interaction. Embodiments may operate online communities through websites under domains containing marks such as "NeverMeet", "NoFaces", "FriendlyStrangers", "SmallWorld", or the like, depending on the legal availability of such domains and marks.

Some approaches described herein run counter to an assumption that social networking sites should help people meet each other in person. Instead, some embodiments take the approach that an online version of a "strangers in a bar" conversation can be worthwhile. People may be more candid in seeking—and giving—life advice, for instance, if they know they'll never meet in person. Other interactions may also be less inhibited. It may also be helpful for conventional matchmaking sites to offer subscribers a practice forum in which they converse with people whose actual identity they will almost certainly never learn, who will almost certainly never learn their identity, and whom they will almost certainly never meet in person (intentionally or even by accident).

In some embodiments, social network member geographic locations are obtained or approximated, and that geographic information is used to limit online interaction in order to reduce the risk that members who interact online will meet (accidentally and/or intentionally) offline.

For example, in some embodiments, a member can specify one or more geographic areas to be avoided by the system when the system is determining which other members should be able to contact this member. In one simple case, a member who lives in city F can tell the system to avoid allowing that member contact with other members who also live in F. Depending on the implementation, the territories to avoid may be landmarks (Eiffel Tower, . . . ), cities, counties, provinces, states, regions, nations, and/or continents, for instance. A time zone is another example of a geographic region. Territories may be predefined, and accessed through a menu.

In some embodiments, a social networking system may help reduce or prevent online contact between members whose avoidance areas overlap. Thus, if member A says to avoid areas X, Y, Z, and member B says to avoid areas R, S, X, and member C says to avoid areas R, S, T, and member D says to avoid area W, then the social network operates to reduce or eliminate/prevent online interaction (within the social network's virtual community(ies)) between A and B, and between B and C, and it operates to allow (or even encourage) online interaction between A and C, A and D, and B and D. As another example, if Bob lives in California and travels (or plans to travel) to Canada, and Pat lives in Oregon and does not travel, then Bob could list avoidance areas California and Canada, and Pat could list avoidance area Oregon. The system would then allow (or encourage) online interaction between Bob and Pat, because—based on the avoidance areas they specified—there is little risk they will ever be in the same geographic area, and hence little risk they will ever meet offline. By contrast, if Pat listed California in addition to listing Oregon, then the system would take steps to limit or prevent online interaction between Pat and Bob, because their avoidance areas (a.k.a., their personal territories, or their safety zones) overlap.

Some embodiments require that a member specify at least N personal territories, and/or that the member specify a combination of personal territories that satisfies some geographic size requirement. For instance, a member might be required in one implementation to specify at least three personal territories, or to specify at least two territories which are each at least the size of Switzerland, or which meet some minimum combined population total, e.g., territories containing at least fifty million people.

In some embodiments, virtual community cultural pressure, community website contractual terms of use, and/or other similar tools are used to encourage or legally require members to specify a personal territory that includes their current residence. In some embodiments, as an alternative or in addition, tools such as geolocation software or correlation with a payment database are used to identify the apparent approximate geographic location of the computer or other device being used by a member to access the online community, and that geographic region is included (visibly to the member in some cases, invisibly in others) among the member's personal territories. In some embodiments, a member's list of personal territories is private to the member—it is used by the system internally, but is not made visible to other members.

A geographic territory normally is a characteristic of a member, at least as to the geographic territory in which the member resides. But other criteria need not apply to the member who specifies them as avoidance criteria. A member can ask to avoid communication with members who have a particular profession, for instance, without also being a member of that profession.

In some embodiments, a member can specify avoidance criteria that are not geographic in addition to, or instead of, specifying the geographic territories to avoid. For example, a physician who is an expert in some medical field may tell the system to help her avoid communications online with other physicians generally, or perhaps only with other physicians in her medical field. Another physician may similarly tell the system to avoid communications with attorneys. More generally, avoidance criteria may be any of a wide variety of criteria, e.g., geographic location, profession, certain topics of discussion, and so on. Avoidance criteria may be specified in a profile.

The avoidance criteria may have an effect in a system in various ways, depending on the system embodiment.

First, when the system is making or offering a random or semi-random (e.g., based on shared interest in a topic) introduction between two members, it may operate to avoid introducing two members whose personal territories overlap.

Second, when the system is selecting a privacy quality control reviewer of a communication, it may operate to avoid selecting a reviewer whose territory overlaps with either the source member of the communication or the intended destination member of the communication.

Third, when the system is preparing to display a blog posting, forum posting, comment, or other quasi-public posting by one member, it may limit what is seen by other member(s) so that the posting is not seen by member(s) whose personal territory(ies) overlap the personal territory of the poster. As a result, not every member who looks at (or tries to look at) a blog at a given point in time will necessarily see the same content as the other member(s). Rather, postings may be filtered to prevent viewing by members whose personal territories overlap those of the original poster and/or those of a subsequent commenter. In some implementations, overlap between a potential viewer's territory and any poster's (original, later commenter) territory makes the entire blog (comments and all) unavailable to the potential viewer. In other implementations, redactions are made based on individual's territories, so that the potential viewer sees at least some of the blog but does not see portions posted by members whose territory overlaps the viewer's territory. More generally, a system may filter access to postings to satisfy member avoidance criteria, geographic or otherwise, to reduce the risk that members who communicate online might meet offline.

Some embodiments do not ask members for personally identifying information 140 when they register to obtain a username 138. Other embodiments do ask, e.g., to receive a one-time registration fee, but do not correlate usernames to that personal information.

In some embodiments, at least some social network member communications are reviewed for potential disclosure of personally identifying information, and review results are used to discourage and/or limit online communications that apparently increase the risk that members who interact online will meet (accidentally and/or intentionally) offline. Such privacy reviews may be automated, by people, or both.

For example, in some embodiments, member communications (posting, email, IM, chat, etc.) are scanned for key words and phrases that may indicate increased risk of disclosing a member's offline identity; online, usernames not reminiscent of offline names etc. are used to identify members. Such privacy concern triggers may include, e.g., personal or family names, phone numbers, addresses (postal, email, web), account numbers, gender, race, ethnicity, age, title, profession, geographic names, landmark names, employer names, phrases such as "where do you live?", "I live in . . . ", "How old are you?", "What school do you go to?", etc.

Various steps may be taken when scanning detects such a privacy concern trigger. The communication sender may be told, and given a chance to edit the communication before it is sent to any other member. The communication may be sent to a randomly selected (or an expertise-and-trust-proven-selected) member who serves as a privacy quality control reviewer. The trigger may be modified (for learning, eg., as spam detectors learn, but to detect privacy concerns better, not to detect spam). The communication may be sent to its intended member destination(s), with or without some modification by the sender and/or by the system to enhance sender privacy.

In some embodiments, a privacy quality control reviewer receives a communication snippet without receiving any indication who is sending it, reviews it, and makes a judgment about whether it reveals personally offline-identity-revealing information. Reviewer comments are sent back to the sender. The sender may make changes, after which the edited communication is sent to another randomly selected (but again with non-overlapping personal territory) privacy quality control reviewer, and so on. Thus, the community helps protect the privacy of its members. Individual members may build up, over time, expertise in judging the risk of disclosure, and that expertise may in turn be rated anonymously by the members whose communications are reviewed.

Members who prove to be expert and trustworthy at assessing privacy disclosure risks—as judged by those whose privacy they seek to protect—may be rewarded in ways that do not risk disclosure of their own privacy. For example, reviewers may take pride in private recognition by the system of their relative rank among all privacy reviewers. Reviewers may enjoy being trusted with review of messages which are more likely than other reviewed messages to disclose a member's offline identity.

In some embodiments no privacy reviewer is sent more than some small predetermined number of communications from a given member to review. For example, a reviewer might be sent no more than five communications over the course of one year from a given member.

In some embodiments, a system goal is to strike a balance that favors online interaction without unacceptable risk of disclosing offline identities. In some embodiments, the system cannot prevent intentional disclosure of a member's offline identity by that member. But it can often prevent, or at least reduce, the risk of accidental disclosure of a member's offline identity by that member.

In some embodiments, social network member computing characteristics are reviewed for potential disclosure of offline geographic location or offline identity revealing information. Computing characteristics may then be hidden and/or altered to reduce or eliminate the risk that members who interact online will meet (accidentally and/or intentionally) offline. Familiar technical means of promoting anonymity by hiding and/or altering computing characteristics can be used, such as not tracking IP addresses (except possibly to initially assign a personal territory as discussed herein), using anonymizing servers or proxies, and so on.

Usernames and other proposed online identifiers 114 can be compared to lists 156, 158 of personal and family names, cities, etc., to reduce the risk that a username containing those or other privacy concern triggers will be accepted 332 for use in the system. Dictionary search tools used to find passwords, for instance, could be adapted for use in scanning usernames 114 for personal names, cities, family names, professions, etc.

In some embodiments, posting or other communication of pictures (jpg, gif, tiff, pdf, etc.) is not supported by the system. In other embodiments, pictures may be allowed, but every picture is subject to privacy quality control review. For example, cartoon images, avatars, animations, and other images that do not readily reveal the type of identifying characteristics shown in an identification photograph may be allowed.

In some embodiments, links to outside websites are not supported by the system. In other embodiments, links may be allowed, but every link is subject to privacy quality control review. At least some disguised links, such as "goo g le dot co m" (note spacing, use of "dot"), may be detected and treated as links.

In some embodiments, each user has two usernames. One (internal username) is seen by the user, while the other (external username) is seen by other people in the system. Messages can be scanned automatically for either type of username; internal usernames in particular can be privacy concern triggers. The user does not necessarily know its own external username; in some embodiments, external usernames are kept secret from their users. Postings of a user which include the user's external username are modified to show the user's internal username instead, at least when the user is logged on. Another person logging on nearby, e.g., a friend of the user, should not see those messages anyway, since the friends' personal territories will overlap. Likewise, if the user logs in under a different account, but is still in the same territory, the original account's messages should be filtered out and thus not displayed to the user.

In some embodiments, the external username associated with a given internal username (via a table or other data structure) is changed on occasion. The user is not normally notified that a change in external username has occurred, but may infer such a change from a loss of contact with some other user that occurs when the old username is disabled. An external username may be changed or otherwise disabled (e.g., user evicted from system) on a regular schedule, e.g., every month, on a randomized schedule, in response to a request from the user ("I'm uncomfortable—please move me to a new virtual bar with a fresh face and new people to meet online"), and/or in response to heightened risk of privacy loss as indicated by automated review of messages to/from the user for privacy concern triggers and/or by actions by privacy quality control reviewers (especially if the system notes a history of privacy concerns). The new external username normally bears little or no resemblance to the previous external username.

In some embodiments, a given internal username is associated with more than one external username, e.g., a different external username may be used in each of several different countries or other territories. This may reduce the risk that when users A and B communicate, A, and C communicate, and B and C communicate, that B and C will together learn more than desired about A's identity. B and C will know A under different external usernames of A, and hence be less likely to correlate information about A.

It will be apparent that preserving one's anonymity is a way to help reduce the risk that one will never meet in person offline someone that one has met online. But it is not the only way. Embodiments can also help prevent unwanted offline meetings by limiting online interaction to members whose personal territories (as stated by the members and/or determined automatically by the system from geolocation) do not overlap.

Traditional profile elements, which contain personally identifying information such as age, gender, race, profession, and geographic location, will likely be used rarely if at all in some embodiments. However, topics of interest might be specified in a profile that is accessible to other members (at least, to those whose personal territories do not overlap your own).

Tools and techniques presented herein may be embodied in various ways, e.g., processes and/or hardware on a server computer 108, on a client 106 or peer 106, or on a standalone computer, software (data instructions) in RAM or permanent storage for performing a process, general purpose computer hardware configured by software, special-purpose computer hardware, data produced by a process, and so on. Computers, PDAs, cell phones, and any device 106, 108 having user interface and some network transmission 134 capabilities may be part of a given embodiment. Touch screens, keyboards, other buttons, levers, microphones, speakers, light pens, sensors, scanners, and other I/O devices 134 may be configured to facilitate or perform operations to achieve the methods and systems, and method results, which are described here. Combinations of these may also form a given embodiment.

In view of the foregoing, it will be understood that the present disclosure describes features which can be used independently of one another in embodiments that focus on different approaches. Many features described here could be provided in a given commercial product or services package, but may nonetheless be patentably distinct. Determinations of patentable distinctness are made after a disclosure is filed, and are made by patent examination authorities.

It may be helpful, however, to note the following. U.S. patent application Ser. No. 11/870,475 filed Oct. 11, 2007 involves privacy reviews of electronic communications in an online community, from the perspective of a member of the online community, including for example a member manifesting consent to a privacy review. U.S. patent application Ser. No. 11/870,506 filed Oct. 11, 2007 also involves privacy reviews of electronic communications in an online community, but from the perspective of a service provider, including for example a service provider system determining that an electronic communication should be submitted to a privacy review. U.S. patent application Ser. No. 11/876,996 filed Oct. 23, 2007 involves avoidance criteria specified by a member of an online community for regulating electronic communications to reduce the risk of offline encounters arising from online interactions. U.S. patent application Ser. No. 11/877,112 filed Oct. 23, 2007 also involves avoidance criteria, but from the perspective of a service provider. Each of these previous applications claims priority to the three provisional applications identified at the beginning of this present application, and there is some overlap in the specifications of this present application and the other non-provisional applications. It is respectfully submitted, however, that the different non-provisional applications claim different inventions.

It may also be helpful to note that one of the various ways in which features disclosed herein can be grouped is according to which entity acts. Some steps are unique to a role. A member does steps that are not done by a service provider, and vice versa.

It may also be helpful to note that another way to group features disclosed herein is according to the steps/structures employed.

For example, some embodiments employ avoidance criteria and/or take steps to limit offline interaction based on information from online community members about their offline identity. Thus, some embodiments include accepting an avoidance criterion from a member (current or prospective) of a social network; and limiting (reducing and/or preventing between those with overlapping avoidance criteria, and/or favoring and/or requiring between those with non-overlapping avoidance criteria) online interaction between the member and at least one other member of the social network based at least in part on the members' avoidance criteria. In some, the social network accepts avoidance criteria including a list of personal territories from the member, and limits online interaction based on the personal territories of the members.

As another example, some embodiments employ privacy concern trigger and/or take steps to alert online community members when their offline identity information might be disclosed by a communication. Thus, some embodiments include automatically scanning a communication from a member (current or prospective) of a social network for at least one privacy concern trigger; and submitting the communication to a privacy quality control reviewer after finding at least one privacy concern trigger. In some, the privacy quality control reviewer anonymously reviews the communication and indicates an extent to which the reviewer has concluded that the communication is likely to disclose offline identity information of the member.

As another example, some embodiments employ username mapping and/or take steps to hide/change usernames to make an online community member's online identity a moving target or otherwise difficult to permanently pin down. Thus, some embodiments include accepting a user-visible (internal) username from a user of a website, phone, PDA, or other networked service; and displaying a different username (external) username for that same user to other users of the service. Some also include dynamically changing the external username while maintaining the associated internal username; the change may be on an automated schedule, and/or at specific request of the user, and/or in response to some indication (detected automatically or manually) that the privacy of the user may be compromised or near compromise.

As another example, some embodiments provide privacy protection through username 112 restrictions that limit username content to reduce or avoid use of offline identity information 140 in usernames 116.

Features disclosed herein may also be categorizable into patentably distinct embodiments in other ways. Regardless, we now turn to more detailed examples of ways in which features may be organized.

In the following examples particular attention is paid to anonymous social networking with community-based privacy reviews, from a reviewed person's perspective.

Some embodiments include a method for use by a first person belonging to an online community, the first person having an online identity published within the online community, the first person also having an offline identity which the first person has asserted should not be published in the online community, the method including the first person: consenting to a privacy review of a communication between the first person and a second person who also belongs to the online community; and receiving a result of the privacy review, the result indicating the extent to which the communication was considered to pose a risk of disclosing at least part of the first person's offline identity in the online community.

In some cases, the first person receives notice that the privacy review is based at least in part on scanning communications before they are delivered to their identified destination(s) in the online community.

In some cases, the first person receives notice that the privacy review is based at least in part on manually and/or automatically scanning communications for at least one of the following: personal name, family name, phone number, offline address, online address, geographic name, landmark name, questions seeking geographic information, statements containing geographic information, questions seeking employment information, statements containing employment information, gender, race, ethnicity, age, title, profession.

In some cases, the first person consents to privacy review of the communication by a third person who also belongs to the online community, and the third person has an offline identity which is not disclosed to the first person. In some cases, the first person consents to privacy review of the communication by a third person, and the method further includes the first person providing an opinion about the third person's privacy review. In some cases, the first person consents to privacy review of the communication by a third person, and the method further includes the first person receiving a reputation summary indicative of the third person's reputation for privacy reviews, based on multiple privacy reviews performed by the third person. In some cases, the first person consents to privacy review of the communication by a third person who also belongs to the online community, and the third person is at an offline location which lies outside a list of territories specified by the first person.

Some methods further include the first person editing the communication, in response to the privacy review, before the communication reaches the second person. Some include the first person submitting the edited communication to another privacy review.

In some embodiments, the first person receives notice that their offline identity is hidden from any person who performs a privacy review on their communication. In some, the first person receives notice that their online identity is hidden from any person who performs a privacy review on their communication.

In some embodiments, the first person consents to privacy review of some images in communications from the first person to another person in the online community. In some, the first person consents to privacy review of all images in communications from the first person to another person in the online community. In some, the first person consents to privacy review of some online addresses in communications from the first person to another person in the online community, and online addresses include at least website addresses and email addresses. In some, the first person consents to privacy review of all online addresses in communications from the first person to another person in the online community. In some, the first person consents to privacy review of offline addresses in communications from the first person to another person in the online community.

In some embodiments, the first person receives notice that the privacy review includes automatically scanning a communication and then submitting the communication to a person for privacy review if a privacy concern trigger is found by the automatic scanning.

In the following examples particular attention is paid to anonymous social networking with offline encounter avoidance criteria, from a service provider's perspective.

Some embodiments include a method to help reduce the risk of offline encounters between members of an online community, the method including: obtaining a first avoidance criterion from a first member of the online community, the first avoidance criterion specifying an aspect of the first member's offline life that is designated by the first member to be shielded from the first member's online life; obtaining a second avoidance criterion from a second member of the online community, the second avoidance criterion specifying an aspect of the second member's offline life that is designated by the second member to be shielded from the second member's online life; and using the avoidance criteria to determine an offline encounter risk level of the two members, namely, a value which is based at least in part on the extent of overlap, if any, between their avoidance criteria.

In some embodiments, a method includes securely storing the obtained avoidance criteria such that a member's choice of avoidance criteria is not published in the online community to other members. Some embodiments include at least one of the following: securely storing offline identity information about members so that it is not published in the online community to other members; informing members that their offline name is not required and then allowing them to post communications in the online community without first providing their offline names.

Some embodiments include displaying to one of the members an indication of the number of members of the online community whose avoidance criteria overlap at least one avoidance criterion of that member, thereby allowing that member to estimate the reduction in online community access which would result from retaining the at least one avoidance criterion. An indication of the number of members may be numeric or visual (e.g., partially filled bar or map), and may be an exact count or an estimate.

Some embodiments include regulating communication between the first member and the second member in accordance with their offline encounter risk level, with a goal of reducing the risk that they will encounter each other offline as a result of communications in the online community.

In some embodiments, the obtaining steps obtain geographic territory designations, and communication between the two members is regulated in at least one of the following ways: direct communication between the two members is not supported by online community services when their respective geographic territory designations overlap; direct communication between the two members is suggested by an online community service when their respective geographic territory designations do not overlap.

In some embodiments, the obtaining steps obtain geographic territory designations, and the method further includes submitting a communication to the second member for privacy review when the respective geographic territory designations of the two members do not overlap, the communication being from the first member and also being not addressed to the second member by the first member.

In some embodiments, the obtaining steps obtain geographic territory designations, and the method further includes informing a member of at least one of the following: the territory in which the member resides should be designated, the territory in which the member resides must be designated, the territory in which the member resides will be automatically designated, at least one territory in which a member does not reside may be designated, a territory in which the member plans to travel should be designated, a territory in which the member plans to travel must be designated, a territory in which the member plans to travel may be designated.

In some embodiments, the obtaining steps obtain geographic territory designations, and the method further includes informing a member of at least one of the following: at least one territory should be designated, at least one territory must be designated, at least N territories should be designated (N being a stated value greater than one), at least N territories must be designated, territories which together have at least a specified total area should be designated, territories which together have at least a specified total area must be designated, territories which together have at least a specified total population should be designated, territories which together have at least a specified total population must be designated.

In some embodiments, the obtaining steps obtain geographic territory designations, and the method further includes automatically determining a member's likely residence and then including within that member's avoidance criteria at least one covering geographic territory, that is, a territory which includes the member's likely residence. In some, the steps of automatically determining the member's likely residence and including a covering geographic territory are performed transparently to the member.

In some embodiments, the obtaining steps obtain designations of at least one of the following: geographic territory, profession, a discussion topic listed as appropriate for an existing forum in the online community, gender, marital status, ethnicity, race, age, offline family name, offline personal name, organization membership, religious affiliation, membership in one or more specified online communities, thereby allowing members to designate characteristics of other members who they wish to avoid encountering.

A specified aspect of offline life may be past, present, and/or contemplated in the future; it need not come about to be specified as an avoidance criterion. It may even be intended solely as a buffer, e.g., specifying an entire state instead of merely specifying a county within the state even if there are no plans to travel outside the county.

In some embodiments, the first obtaining step obtains designations of multiple avoidance criteria from the first member, and the offline encounter risk level depends on at least two of those multiple avoidance criteria. In some, the first obtaining step obtains designations of multiple avoidance criteria from the first member in a Boolean expression. Boolean expression operators may be implicit, e.g., a blank space could be used to denote a logical AND operator.

Some embodiments include obtaining from the first member an indication of a first acceptable level of risk, which represents the first member's willingness to risk encountering offline some other member of the online community, and obtaining from the second member an indication of a second acceptable level of risk, which represents the second member's willingness to risk encountering offline some other member of the online community. Some include at least one of the following steps: hiding online community contact information of each of the two members from the other member after determining that the offline encounter risk level of the two members exceeds a level corresponding to the level of acceptable risk indicated by at least one of two members; displaying to at least one of the two members an online community username of the other member after determining that the offline encounter risk level of the two members is less than the level(s) of acceptable risk indicated by the two members; introducing the first member and the second member online using their respective usernames, after determining that the offline encounter risk level of the two members is less than the level(s) of acceptable risk indicated by the two members.

In some embodiments, the offline encounter risk level of the two members exceeds a predetermined value, and the method further includes hiding from each of the two members communications which are posted in the online community by the other of the two members. In some, the hiding step hides at least one of the following: a blog posting, a forum posting, a member profile, a member username, an electronic communication.

In some embodiments, the step of obtaining a first avoidance criterion occurs during registration of the first member, and that registration must be completed before the first member can post any communication to other members in the online community. In some, the step of obtaining a first avoidance criterion occurs after registration of the first member and modifies a previously obtained set containing at least one first member avoidance criterion, and the method further includes re-determining the offline encounter risk level of the two members in view of the modified avoidance criterion. In some embodiments, securely storing data does not preclude data access by authorized administrative personnel.

In the following examples particular attention is paid to anonymous social networking with offline encounter avoidance criteria, from an online community member's perspective.

Some embodiments include a method for an online community member to use to help reduce the risk of an offline encounter with another member of the online community, the method including the online community member: receiving notice that communications in an online community will be regulated in order to reduce online communication between community members who have overlapping avoidance criteria; and ratifying an avoidance set which includes at least one avoidance criterion.

In some embodiments, the ratifying step includes at least one of the following: the online community member selecting at least one avoidance criterion from displayed selectable avoidance criteria, the online community member communicating in the online community while subject to an avoidance criterion which is automatically included in the avoidance set. Some embodiments include the online community member reviewing selectable avoidance criteria displayed by an online community service provider. Some include the online community member receiving notice that a given member's avoidance set is not published in the online community to other members. Some include the online community member receiving an indication of the number of other members of the online community whose avoidance criteria overlap that member's avoidance set.

In some embodiments, the receiving notice step includes receiving notice that communications will be regulated with the goal of preventing any direct communication in the online community between community members who have overlapping avoidance criteria. In some, the receiving notice step includes receiving notice that communications in the online community will be regulated with the goal of hiding, from each of two members who have overlapping avoidance criteria, the online presence of the other of the two members.

Some embodiments include the online community member modifying the avoidance set by at least one of the following: selecting an avoidance criterion to include in the avoidance set, selecting an avoidance criterion to exclude from the avoidance set. In some, the avoidance set includes at least one geographic territory designation, thereby indicating that the online community member will have reduced communication in the online community with other members who may be physically located in the designated geographic territory(ies).

In some embodiments, the online community member is a first member, and the method further includes the first member consenting to allow privacy review of one of its online communications by a privacy reviewer if the privacy reviewer is also a member of the online community who has designated at least one geographic territory in a privacy reviewer avoidance set, and if the privacy reviewer avoidance set does not overlap the geographic territory(ies) designated in the first member's avoidance set. In some, the avoidance set includes at least the territory in which the online community member resides. In some, the avoidance set includes at least one territory in which the online community member does not reside but plans to travel.

In some embodiments, the avoidance set ratifying step includes selecting a geographic territory using a Boolean combination of constituent territories. In some, the ratifying step includes selecting designations of at least one of the following: geographic territory, profession, a discussion topic listed as appropriate for an existing forum in the online community, gender, marital status, ethnicity, race, age, offline family name, offline personal name, organization membership, religious affiliation, specified online community membership, thereby allowing the online community member to designate characteristics of other members who the online community member wishes to avoid encountering. In some, the ratifying step includes selecting designations of multiple avoidance criteria combined in a Boolean expression.

Some embodiments include the online community member 100 accessing the online community through a username 116 which has been subjected to privacy review to reduce the risk that it will disclose information about the online community member's offline identity 140.

Some embodiments include the online community member specifying an acceptable level of risk, which represents the member's willingness to risk encountering offline some other member of the online community.

In some embodiments, the online community member is a first member, and the method includes the first member receiving an introduction to another online community member whose avoidance criteria do not overlap the first member's avoidance set. In some, the online community member is a first member, and the method includes the first member attempting unsuccessfully to communicate directly in the online community with another online community member whose avoidance criteria overlaps the first member's avoidance set.

In the following examples, particular attention is paid to privacy protection through username restrictions.

Some embodiments include a method for use by an online service provider 104 to help maintain the privacy of offline identities 140 of online users 100, the method including: testing 322 a proposed username 114 by comparing at least a portion of its content to a set of personal identification information tokens 150; and accepting 332 the proposed username 114 if it satisfies a predetermined privacy criterion 152, the privacy criterion being defined in terms of matches to personal identification information tokens.

In some embodiments, the testing step 322 compares proposed username 114 content to tokens 150 using at least one of the following: an interactive question-and-answer session; an automatic string operation. In some embodiments, the testing step 322 compares proposed username content 114 to tokens 150 obtained 308 from personal information supplied by an online user 100, and the privacy criterion 152 is defined in terms of avoiding matches to those tokens. In some, the testing step 322 compares proposed username content 114 to tokens obtained 310 from at least one of: a directory of offline addresses, a directory of online addresses, a directory of names, a directory of phone numbers, and the privacy criterion is defined in terms of avoiding matches to those tokens. In some, the testing step 322 compares proposed username content to tokens obtained 312 from at least one of: a database of registrations, a database of licenses, a database of grants, a database of government records, and the privacy criterion is defined in terms of avoiding matches to those tokens. In some, the testing step 322 compares proposed username content to tokens obtained 314 from a collection of fictional names, and the privacy criterion is defined in terms of matching those tokens. In some, the testing step 322 compares proposed username content to a result 142 of an online search engine search.

Some embodiments include accepting 304 the proposed username from an online user 100 before testing the proposed username. Some include automatically generating 306 the proposed username before testing the proposed username.

Some embodiments include a method for username selection which reduces the risk that a username will disclose information about an online user's offline identity 140, the method including: receiving 208 a question 124 regarding a proposed username and its relation, if any, to the online user's offline identity; and answering 210 the question. Some include receiving additional questions regarding the proposed username and its relation, if any, to the online user's offline identity, and answering the additional questions.

Some embodiments include proposing 212 a username. Some include specifying 222 an acceptable level of risk that the proposed username will disclose information about the online user's offline identity. Some include stating 214 that the proposed username is a fictional name.

Some embodiments include receiving 208 and answering 210 at least one of the following questions 124: whether the proposed username contains any part of your name, whether the proposed username contains any part of the name of anyone in your family, whether the proposed username contains any part of the name of anyone you have met, whether the proposed username contains the name of a pet, whether the proposed username contains a nickname, whether the proposed username contains the name of your employer, whether the proposed username contains the name of a business you are connected with, whether the proposed username refers to your religious or spiritual beliefs, whether the proposed username refers to your political beliefs, whether the proposed username refers to any organization to which you belong or which you support, whether the proposed username contains any part of any of your email addresses, whether the proposed username contains any part of a website address, whether the proposed username contains any part of any of your offline addresses, whether the proposed username contains any part of any of your phone numbers, whether the proposed username refers to any of your physical characteristics (e.g., height, weight, gender, race, hair color, eye color, tattoos, disabilities), whether the proposed username refers to your ethnicity. Some embodiments include reading 216 part of a search engine search result and being asked whether it pertains to you or anyone you know.

In the following examples, particular attention is paid to privacy protection through username mapping.

Some embodiments include a method for use by an online service provider to help maintain the privacy of offline identities of online users, the method including: assigning a first user of an online service a private username which is not kept hidden from the first user but is kept hidden from other users of the online service; and assigning the first user at least one public username which is kept hidden from the first user but is not kept hidden from at least some other users of the online service.

Some embodiments include receiving from the first user content directed to at least one other user; and displaying the content together with an attribution which depends on the online service account used, namely, showing an attribution to the private username when the first user is logged in and showing an attribution to a public username when another user is logged in.

Some embodiments include associating geographic territories with users of the online service; the content is hidden from display to other users whose associated geographic territory overlaps the first user's associated geographic territory. Some include associating geographic territories with users of the online service, and all public usernames assigned to the first user are kept hidden from other users whose associated geographic territory overlaps the first user's associated geographic territory.

In some embodiments, at least two different public usernames of a given user are in active use and displayed in each of at least two respective geographic territories at one time.

In some embodiments, the private username is chosen by the online user, in some it is assigned by the system, and in some it is chosen by the user subject to approval by the system. The public names are generated by the system. Different public (aka external) usernames of a given user may be used in different geographic regions and/or in different forums. The system may autogenerate usernames by combining root words, numeric values, and in some cases associated images (which do not contain realistic user likenesses). Hiding a username does not necessarily preclude revealing it to an authorized administrator, but in some embodiments the correlation between users and usernames is not readily determined even by such administrators.

CONCLUSION

Although particular embodiments are expressly illustrated and described herein as methods or systems, it will be appreciated that discussion of one type of embodiment also generally extends to other embodiment types. For instance, the descriptions of methods in connection with FIGS. 2 and 3 also help describe systems like those described in connection with FIG. 1, and vice versa. Likewise, example method embodiments help describe system embodiments that operate according to those methods, product embodiments produced by those methods (such as a set of personal identification information tokens 150, or a list of questions 124 about possible relationships between personal offline identity and a proposed online identifier), and configured media embodiments in which a medium is configured by data and instructions to perform those methods. It does not follow that all limitations from a given embodiment are necessarily read into another.

Components, steps, and other aspects of different examples given herein may be combined to form a given embodiment.

Reference has been made to the figures throughout by reference numerals. Any apparent inconsistencies in the phrasing associated with a given reference numeral, in the figures or in the text, should be understood as simply broadening the scope of what is referenced by that numeral.

As used herein, terms such as "a" and "the" are inclusive of one or more of the indicated item or step. In particular, in the claims a reference to an item generally means at least one such item is present and a reference to a step means at least one instance of the step is performed.

Reference to avoidance "criteria" contemplates the plural "criteria" and/or the singular "criterion" unless two or more criteria are clearly required, e.g., for comparison of criteria. Reference to avoidance "criterion" means one or more avoidance criteria.

Headings are for convenience only; information on a given topic may be found outside the section whose heading indicates that topic.

All claims as filed are part of the specification. Repeated claim language may be inserted outside the claims as needed.

While exemplary embodiments have been shown in the drawings and described above, it will be apparent to those of ordinary skill in the art that numerous modifications can be made without departing from the principles and concepts set forth in the claims. Although the subject matter is described in language specific to structural features and/or methodological acts, it is to be understood that the subject matter defined in the appended claims is not necessarily limited to the specific features or acts described above the claims. It is not necessary for every means or aspect identified in a given definition or example to be present or to be utilized in every embodiment. Rather, the specific features and acts described are disclosed as examples for consideration when implementing the claims.

All changes which come within the meaning and range of equivalency of the claims are to be embraced within their scope to the full extent permitted by law.

What is claimed is:

1. A computerized method for use by an online service provider to help maintain the privacy of offline identities of online users, the method comprising:
   a computer system testing a proposed online identifier which is a username or an avatar, by comparing at least a portion of said proposed online identifier's content to a set of personal identification information tokens; and
   the computer system accepting the proposed online identifier, which satisfies a predetermined privacy criterion, the privacy criterion being defined in terms of matches to personal identification information tokens to prevent said proposed online identifier from disclosing information about the online user's offline identity.

2. The method of claim 1, wherein the testing step compares proposed online identifier content to tokens using at least one of the following: an interactive question-and-answer session; an automatic string operation.

3. The method of claim 1, wherein the testing step compares proposed online identifier content to tokens obtained from personal information supplied by an online user, and the privacy criterion is defined in terms of avoiding matches to those tokens.

4. The method of claim 1, wherein the testing step compares proposed online identifier content to tokens obtained from at least one of: a directory of offline addresses, a directory of online addresses, a directory of names, a directory of phone numbers, and the privacy criterion is defined in terms of avoiding matches to those tokens.

5. The method of claim 1, wherein the testing step compares proposed online identifier content to tokens obtained from at least one of: a database of registrations, a database of licenses, a database of grants, a database of government records, and the privacy criterion is defined in terms of avoiding matches to those tokens.

6. The method of claim 1, wherein the testing step compares proposed online identifier content to tokens obtained from a collection of fictional names, and the privacy criterion is defined in terms of matching those tokens.

7. The method of claim 1, wherein the testing step compares proposed online identifier content to a result of an online search engine search.

8. The method of claim 1, further comprising accepting the proposed online identifier from an online user before testing the proposed online identifier.

9. The method of claim 1, further comprising automatically generating the proposed online identifier before testing the proposed online identifier.

10. The method of claim 1, wherein the proposed online identifier includes a proposed username.

11. A computerized method which reduces the risk that an online identifier will disclose information about an online user's offline identity, the method comprising:
   a computer system receiving electronically a question regarding a proposed online identifier, which is a username or an avatar, said question causing an inquiry whether at least a portion of said proposed online identifier's content coincides with a set of the online user's offline identity; and the computer system answering the question to help maintain the privacy of offline identities of online users.

12. The method of claim 11, further comprising receiving additional questions regarding the proposed online identifier and its relation, if any, to the online user's offline identity, and answering the additional questions.

13. The method of claim 11, further comprising proposing an online identifier.

14. The method of claim 11, further comprising specifying an acceptable level of risk that the proposed online identifier will disclose information about the online user's offline identity.

15. The method of claim 11, further comprising stating that the proposed online identifier includes a fictional name.

16. The method of claim 11, wherein the method comprises electronically receiving and answering at least one of the following questions: whether the proposed online identifier contains any part of your name, whether the proposed online identifier contains any part of the name of anyone in your family, whether the proposed online identifier contains any part of the name of anyone you have met, whether the proposed online identifier contains the name of a pet, whether the proposed online identifier contains a nickname.

17. The method of claim 11, wherein the method comprises electronically receiving and answering at least one of the following questions: whether the proposed online identifier contains the name of your employer, whether the proposed online identifier contains the name of a business you are connected with.

18. The method of claim 11, wherein the method comprises electronically receiving and answering at least one of the following questions: whether the proposed online identifier refers to your religious or spiritual beliefs, whether the proposed online identifier refers to your political beliefs, whether the proposed online identifier refers to any organization to which you belong or which you support.

19. The method of claim 11, wherein the method comprises electronically receiving and answering at least one of the following questions: whether the proposed online identifier contains any part of any of your email addresses, whether the online identifier username contains any part of a website address, whether the proposed online identifier contains any part of any of your offline addresses, whether the online identifier username contains any part of any of your phone numbers.

20. The method of claim 11, wherein the method comprises electronically receiving and answering at least one of the following questions: whether the proposed online identifier refers to any of your physical characteristics (e.g., height, weight, gender, race, hair color, eye color, tattoos, disabilities), whether the proposed online identifier refers to your ethnicity.

21. The method of claim 11, further comprising reading part of a search engine search result and being asked whether it pertains to you or anyone you know.

22. The method of claim 11, wherein the proposed online identifier includes a proposed username.

* * * * *